Patented Jan. 9, 1940

2,186,714

UNITED STATES PATENT OFFICE 2,186,714

PLASTICIZING POLYMERIC ORGANIC SULPHIDES

Mortimer A. Youker, Wilmington, Del., assignor to E. I. du Pont de Nemours & Company, Wilmington, Del., a corporation of Delaware No Drawing. Application October 22, 1937, Serial No. 170,394

23 Claims. (Cl. 260—33)

This invention relates to plasticized polymeric organic sulphides and particularly to methods for plasticizing polymeric organic sulphides which may be obtained by the reaction of an inorganic sulphide on an organic dihalide bearing the halogen atoms on different carbon atoms.

The polymeric organic sulphides are known materials which are tough elastic rubber-like products. They are chemically different from rubber and react differently with rubber chemicals. Such products, their properties and the methods of making the same are described in United States Patents 1,854,423 and 1,890,191 to J. C. Patrick, and in British Patents 446,173 of 1936 and 453,850 of 1936.

The polymeric organic sulphides have the disadvantage that they are practically insoluble in the ordinary rubber solvents and are very tough, being similar in this respect to ordinary vulcanized rubber. They are difficult to mill, to mold into useful articles and to otherwise manipulate. They generally require special treatment in order to make them plastic enough to be readily formed into useful articles by the methods used in rubber technology. Some agents have been proposed for rendering these products more plastic; for example basic substances such as diphenyl guanidine and complex disulphides such as tetramethyl thiuram disulphide. The basic substances, such as diphenyl guanidine, however, make the material plastic only while it is hot and such basic substances are very slow in their action. Even when the two types of plasticizing agents are used together, the organic polysulphide softens only after a considerable time and much difficulty is experienced in manipulating the tough material on a rubber mill before softening takes place.

It is an object of the present invention to provide a rapid method for plasticizing polymeric organic sulphides. Another object is to provide new plasticizing agents for the polymeric organic sulphides. A further object is to render the polymeric organic sulphides more easily manipulated on a rubber mill and more easily molded into useful products. Still further objects are to provide new compositions of matter and to advance the art. Still other objects will appear hereinafter.

These objects may be accomplished in accordance with the present invention which comprises subjecting the polymeric organic sulphide to the action of an organic mercaptan and an unpolymerizable organic disulphide. I have found that, when a polymeric organic sulphide is subjected to the action of a mercaptan and organic disulphide, the polymeric sulphide is rapidly rendered more plastic so that it can be more readily manipulated.

By the term "an organic mercaptan" as employed herein and in the claims, I mean a compound in which the sulphur of the sulphhydryl group is directly bonded to a carbon of an organic radical. The most effective, and hence the preferred compounds are the unsubstituted monothio naphthols such as thio-alpha-naphthol and thio-beta-naphthol. While the organic mercaptans generally may be employed, it will usually be preferred to employ the thio-phenols and thioalcohols, and of these, the most effective will be compounds of the formula RSH wherein R is a hydrocarbon radical.

While the class of unpolymerizable organic disulphides may be employed, it will generally be preferred to employ the thiuram disulphides, diaryl disulphides and arylene thiazyl disulphides. Of these, the thiuram disulphides, particularly the tetrahydrocarbon-disulphides, and especially the tetraalkyl thiuram disulphides are preferred. The most satisfactory compound for this purpose appears to be tetramethyl thiuram disulphide.

Ordinarily, the quantity of mercaptan and organic disulphide employed will be between about 0.05 to about 1.0% based on the polymeric organic sulphide, although larger and smaller quantities may be employed. Furthermore, while it is preferred to use substantially equal quantities of the mercaptan and the organic disulphide, either one may advantageously be employed in excess of the other in certain cases. Usually, from about ½ to about 2 parts of organic disulphide should be employed for each part of mercaptan.

In order to more clearly illustrate my invention, the preferred modes of carrying the same into effect and the advantageous results to be obtained thereby, the following examples are given:

Example 1

In this example "Thiokol D," which is apparently the reaction product of sodium polysulphide and b:b'-dichloro-ethyl ether, was treated. When 1% of thio-beta-naphthol was added to this product on a rubber mill, no appreciable softening took place. When 1% of tetramethyl thiuram disulphide was then added to the product containing the thio-beta-naphthol, the product was converted from a relatively non-plastic material into an excessively soft sticky material. When 0.5% of tetramethyl thiuram disulphide was added to "Thiokol D" on a mill, no appreciable effect was obtained. However, when 0.5% of thio-beta-naphthol was added to the product containing the tetramethyl thiuram disulphide, an exceedingly soft product was obtained.

Example 2

As shown in the following Table I, various agents were added to "Thiokol D" on a rubber mill in the proportions shown and the plasticity determined immediately after the addition, after aging for 18 hours at 25–30° C. and after aging for 114 hours at 25–30° C. The plasticity and recovery numbers in this table are the numbers obtained with the Williams' parallel plate plastometer at 80° C. The plasticity numbers represent the thickness in thousandths of an inch of a 2 cc. pellet which has been compressed under a load of 5 kilograms for 3 minutes. The recovery numbers represent the increase in thickness in thousandths of an inch of the pellets in one minute after removal of the load.

*Table I*

| Sample | Agents added, percent | Condition after addition | Aged 18 hrs. at 25–30° C. | Aged 114 hrs. at 25–30° C | |
|---|---|---|---|---|---|
| | | | | Plasticity | Recovery |
| 1 | None | Very tough | Very tough | Too tough to get good pellet. | |
| 2 | 0.10 thio-b-naphthol / 0.10 tetramethyl thiuram disulphide | Definite softening | Fairly soft | 107 | 9 |
| 3 | 0.20 thio-b-naphthol / 0.20 tetramethyl thiuram disulphide | Soft | Soft | 50 | 5 |
| 4 | 0.10 thio-b-naphthol / 0.20 tetramethyl thiuram disulphide | ----do---- | Softer than 5 | 72 | 6 |
| 5 | 0.20 thio-b-naphthol / 0.10 tetramethyl thiuram disulphide | ----do---- | Less soft than 3 | 82 | 3 |
| 6 | 0.30 thio-b-naphthol / 0.30 tetramethyl thiuram disulphide | Very soft | Very soft | Too soft to measure. | |
| 7 | 0.20 thio-b-naphthol / 0.20 diphenyl disulphide | Very tough | Some softening | 66 | 3 |
| 8 | 0.20 octyl mercaptan / 0.20 tetramethyl thiuram disulphide | ----do---- | Slight softening | 57 | 8 |
| 9 | 0.20 thio-b-naphthol / 0.20 benzo thiazyl disulphide | ----do---- | Very tough | 140 | 13 |

Example 3

1000 parts by weight of "Thiokol D" was formed into a rough sheet on a warm mill and immediately treated with 2 parts of thio-beta-naphthol and 2 parts of tetramethyl thiuram disulphide. The material on the mill softened almost instantaneously to a very plastic mass readily formed into smooth, adhesive sheets on the rubber mill. After aging at room temperature for 4 days, it had a plasticity of 48—6 at 80° C. The plasticized material dissolved in benzene to give a solution of relatively low viscosity.

Example 4

1000 parts of "Thiokol D" was treated as in Example 1 except that only one part of thio-beta-naphthol and one part of tetramethyl thiuram disulphide were used. Softening likewise took place almost at once but the product was less soft and less adhesive, although still readily soluble in benzene, and somewhat resembled moderately plasticized natural rubber.

Example 5

1000 parts of "Vulcaplas," which is a reaction product of sodium polysulphide with glycerol dichlorhydrin, was treated as in the preceding examples except that 5 parts each of thio-beta-naphthol and tetramethyl thiuram disulphide were used. The material increased in plasticity at once and could be readily worked on the mill.

It is also possible to plasticize the polymeric organic sulphides after they have been compounded and cured, as shown in the following Example 6:

Example 6

The following compound was mixed and cured or vulcanized in the usual manner:

| | Parts |
|---|---|
| "Thiokol D" | 100 |
| Zinc oxide | 10 |
| Diphenyl guanidine | 0.10 |
| Benzothiazyl-disulphide | 0.25 |
| Stearic acid | 0.50 |
| "Gastex"* | 60 |

*"Gastex" is a commercial semi-reenforcing carbon black.

This compounded and cured product dissolved almost at once in benzene in the presence of thio-beta-naphthol and tetramethyl thiuram disulphide. On the other hand, about 18 hours were required for disintegration of the cured material by benzene, in the presence of thio-beta-naphthol alone. The addition of ethyl alcohol to the benzene solution, obtained in the presence of tetramethyl thiuram disulphide and thio-beta-naphthol, precipitated a soft plastic product.

Thus it will be apparent that my agents are effective to plasticize cured polymeric organic sulphides and regenerate the plastic product therefrom.

100 parts of the product of Example 3 was compounded with 10 parts of zinc oxide and 60 parts of "Gastex." The compounded product was then mixed with various curing or vulcanizing agents, such as benzoyl peroxide, zinc chloride and zinc propionate and heated. Improved cures were obtained when a channel black was employed in place of the "Gastex."

The present invention may be applied to any of the polymeric materials which may be obtained from the reaction of water-soluble inorganic polysulphides with organic compounds containing two halogen atoms. Examples of such dihalides, in addition to those given above, which may be employed in preparing polymeric organic sulphides are:

Ethylene dichloride
Ethylene dibromide
Propylene dichloride
Butadiene dichloride (dichloro-1:4-butene-2) and
Dibetachlorethyl acetal The inorganic sulphide may be a mono-sulphide but preferably is a poly-sulphide. Preferably, the polymeric organic sulphide should be of the character obtained by the reaction of an inorganic sulphide on an organic dihalide in which the halogens are on different carbon atoms and which, like those given in the above examples, have properties which make them useful in the arts, especially after they are properly plasticized. When I employ the term "organic dihalide" in the claims, it will be understood that I mean those halides in which the halogens are on different carbon atoms.

The present invention is also particularly useful to plasticize the polymeric sulphides after they have been compounded and cured, thus reclaiming useful plastic material from manufactured articles.

Other mercaptans, which may be employed in place of the thio-beta-naphthol and octyl mercaptan, are other thionaphthols such as thio-alpha-naphthol and homologues of thio-alpha- and thio-beta-naphthols, that is, alkyl substituted thio-beta-naphthol and thio-alpha-naphthol such as the methyl thionaphthols, thiophenol, thiocresol, mono-thio-catechol, dithioresorcinol, thiosalicylic acid, m-chlor-thiophenol, p-phenyl-thiophenol, stearyl ring substituted thiophenol, p-mercapto-diphenyl-methane, 2:3-dimercapto-naphthalene, 2-mercapto-anthracene, nitro-thionaphthol and the halogen substituted thiophenols such as chlor-thionaphthol and brom-thionaphthol. Other aliphatic mercaptans are ethyl mercaptan, propyl mercaptan, butyl mercaptan, amyl mercaptan, dodecyl mercaptan, oleyl mercaptan, thio-cyclohexanol and the like. While the aromatic mercaptans containing a single benzene ring and the aliphatic mercaptans have a definite plasticizing action in the presence of the organic disulphides, they are usually much slower in their action than the preferred thionaphthols.

The thiuram disulphides and particularly tetramethyl thiuram disulphide are the most effective. Other disulphides such as diphenyl disulphide, dinaphthyl disulphide, ditolyl disulphide and benzothiazyl disulphide have a similar but slighter effect. In order to secure the maximum immediate softening illustrated in the examples, the organic disulphide must be added along with the mercaptan. Other thiuram disulphides, which may be used, are indicated as follows:

Diphenyl dimethyl thiuram disulphide
Diphenyl diethyl thiuram disulphide
Tetrapropyl thiuram disulphide
Ethyl phenyl dimethyl thiuram disulphide
Methyl phenyl diethyl thiuram disulphide
Tetraethyl thiuram disulphide
Methylene dimethyl thiuram disulphide
Methylene diphenyl thiuram disulphide
Ethylidene dibenzyl thiuram disulphide
Propylidene diethyl thiuram disulphide
Butylidene dimethyl thiuram disulphide
Butylidene di-o-tolyl thiuram disulphide
Dipentamethylene thiuram disulphide
Butylidene diethyl thiuram disulphide
Propylidene dimethyl thiuram disulphide
Di(phenyl methyl) thiuram disulphide
Di(phenyl ethyl) thiuram disulphide
Tetrapropyl thiuram disulphide
Tetraphenyl thiuram disulphide
Tetranaphthyl thiuram disulphide
Tetrabutyl thiuram disulphide It is usually most convenient to add the agents to the polymeric organic sulphide on a rubber mill, as illustrated in Examples 1 to 5. Alternatively, the material may be treated with a solution of the agents in benzene or the like, with or without mechanical mixing. In this case, a viscous solution or jelly results from which the plasticized material may be isolated by treatment with a solvent such as ethyl alcohol which dissolves the solvent in which the plasticizing agents were dissolved but does not dissolve the polymeric organic sulphide. When the polymeric organic sulphide is in dispersed form in an aqueous medium, it will be convenient to introduce the plasticizing agents by mixing a dispersion of these agents with the dispersion of the polymeric organic sulphide and subsequently coagulating the mixture.

The methods of my invention will generally be carried out at temperatures of between about 10 and 60° C. Higher or lower temperatures may be employed, but without substantial advantage. A suitable temperature can be readily selected by one skilled in the art bearing in mind the effect of temperature upon the physical properties of the polymeric organic sulphide and upon the plasticizing agents.

As illustrated in the examples, the products of the present invention are not only more plastic, but are also more soluble than the original polymeric organic sulphides. Therefore, these products can be more readily employed for the purposes for which the original materials have been proposed or used. For example, they can be more readily compounded with materials commonly used for compounding with rubber and formed into the desired shape and cured for the production of elastic articles. They can also be more readily compounded with rubber. Further, the solutions, obtained in accordance with my invention, can be employed as coating and impregnating compositions and as adhesives.

While I have disclosed the preferred embodiments of my invention and the preferred methods of carrying the same into effect, it will be readily apparent to those skilled in the art that many changes and variations may be made therein without departing from the spirit of my invention. Accordingly, the scope of my invention is to be limited solely by the appended claims, construed as broadly as is permissible in view of the prior art.

I claim:

1. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

2. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of an organic mercaptan and of about 0.05% to about 1% of a member of the group consisting of thiuram disulphides, diaryl disulphides and arylene thiazyl disulphides.

3. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of a thio-phenol and of about 0.05% to about 1% of a thiuram disulphide.

4. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of an aryl mercaptan and of about 0.05% to about 1% of a thiuram disulphide.

5. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of a thio-naphthol and of about 0.05% to about 1% of a thiuram disulphide.

6. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of an unsubstituted thio-naphthol and of about 0.05% to about 1% of a thiuram disulphide.

7. The method of decreasing the resistance to flow of a polymeric organic sulphide obtained by the reaction of sodium polysulphide on b:b'-dichloro-ethyl ether, which comprises subjecting the polymeric organic sulphide to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

8. The method of decreasing the resistance to flow of a polymeric organic sulphide obtained by the reaction of sodium polysulphide on glycerol dichlorhydrin, which comprises subjecting the polymeric organic sulphide to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

9. The method of producing a soft plastic product from a compounded and cured polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the compounded and cured polymeric organic sulphide to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

10. The method of producing a solution of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises treating the polymeric organic sulphide with a solvent therefor in the presence of about 0.5% to about 1% of a member of the group consisting of thio-phenols and thio-alcohols and of about 0.05% to about 1% of a member of the group consisting of thiuram disulphides, diaryl disulphides and arylene thiazyl disulphides.

11. The method of producing a solution of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises treating the polymeric organic sulphide with a solvent therefor containing about 0.05% to about 1% of a member of the group consisting of thio-phenols and thio-alcohols and about 0.05% to about 1% of a member of the group consisting of thiuram disulphides, diaryl disulphides and arylene thiazyl disulphides.

12. A polymeric organic sulphide of decreased resistance to flow obtainable by subjecting a polymeric organic sulphide—of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group—to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

13. A polymeric organic sulphide of decreased resistance to flow obtainable by subjecting a polymeric organic sulphide—of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group—to the action of about 0.05% to about 1% of a thio-phenol and of about 0.05% to about 1% of a thiuram disulphide.

14. A polymeric organic sulphide of decreased resistance to flow obtainable by subjecting a polymeric organic sulphide—of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group—to the action of about 0.05% to about 1% of a thio-naphthol and of about 0.05% to about 1% of a thiuram disulphide.

15. A polymeric organic sulphide of decreased resistance to flow obtainable by subjecting a polymeric organic sulphide—obtained by the reaction of sodium polysulphide on b:b'-dichloro-ethyl ether—to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

16. A polymeric organic sulphide of decreased resistance to flow obtainable by subjecting a polymeric organic sulphide, obtained by the reaction of sodium polysulphide on glycerol dichlorhydrin, to the action of about 0.05% to about 1% of a member of the group consisting of thio-phenols and thio-alcohols and of about 0.05% to about 1% of a member of the group consisting of thiuram disulphides, diaryl disulphides and arylene thiazyl disulphides.

17. A solution of a polymeric organic sulphide obtainable by treating a polymeric organic sulphide—of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group—with a solvent therefor, about 0.05% to about 1% of a member of the group consisting of thio-phenols and thio-alcohols and about 0.05% to about 1% of a member of the group consisting of thiuram disulphides, diaryl disulphides and arylene thiazyl disulphides.

18. The method of decreasing the resistance to flow of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the polymeric organic sulphide to the action of about 0.05% to about 1% of thio-beta-naphthol and of about 0.05% to about 1% of tetra-methyl thiuram disulphide.

19. The method of decreasing the resistance to flow of a polymeric organic sulphide obtained by the reaction of sodium polysulphide on b:b'-dichloro-ethyl ether, which comprises subjecting the polymeric organic sulphide to the action of about 0.05% to about 1% of thio-beta-naphthol and of about 0.05 to about 1% of tetra-methyl thiuram disulphide.

20. The method of decreasing the resistance to flow of a polymeric organic sulphide obtained by the reaction of sodium polysulphide on glycerol dichlorhydrin, which comprises subjecting the polymeric organic sulphide to the action of about 0.05% to about 1% of thio-beta-naphthol and of about 0.05% to about 1% of tetra-methyl thiuram disulphide.

21. The method of producing a soft plastic product from a compounded and cured polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises subjecting the compounded and cured polymeric organic sulphide to the action of about 0.05% to about 1% of thio-beta-naphthol and of about 0.05 to about 1% of tetra-methyl thiuram disulphide.

22. The method of producing a solution of a polymeric organic sulphide of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group, which comprises treating the polymeric organic sulfide with a solvent therefor in the presence of about 0.05% to about 1% of thio-beta-naphthol and of about 0.05% to about 1% of tetra-methyl thiuram disulphide.

23. A polymeric organic sulphide of decreased resistance to flow obtainable by subjecting a polymeric organic sulphide—of the character obtained by the reaction of an inorganic sulphide on an aliphatic dihalide having the halogens on separate carbon atoms which aliphatic dihalide is of the group consisting of aliphatic dihalides consisting of the elements carbon, hydrogen and halogen and aliphatic dihalides consisting of the elements carbon, hydrogen, oxygen and halogen in which the oxygen, when present, is the oxygen of a hydroxy or ether group—to the action of about 0.05% to about 1% of thio-beta-naphthol and of about 0.05 to about 1% of tetra-methyl thiuram disulphide.

MORTIMER A. YOUKER.